(12) United States Patent
Huang et al.

(10) Patent No.: US 9,119,045 B2
(45) Date of Patent: Aug. 25, 2015

(54) WIRELESS DELIVERY OF TELELOCATOR ALPHANUMERIC PROTOCOL (TAP) MESSAGES

(71) Applicant: Cellco Partnership, Basking Ridge, NJ (US)

(72) Inventors: Ye Huang, San Ramon, CA (US); Joseph P. Goldbach, Arlington, TX (US); Reuben G. Martindale, Fort Worth, TX (US); John A. Provinsal, Berkeley Heights, NJ (US); Keith P. Lampron, Lebanon, NJ (US); Brian F. Meehan, Argyle, TX (US); Jerry M. Kupsh, Concord, CA (US)

(73) Assignee: Cellco Partnership, Basking Ridge, NJ (US)

( * ) Notice: Subject to any disclaimer, the term of this patent is extended or adjusted under 35 U.S.C. 154(b) by 48 days.

(21) Appl. No.: 14/104,769

(22) Filed: Dec. 12, 2013

(65) Prior Publication Data
US 2015/0172881 A1    Jun. 18, 2015

(51) Int. Cl.
| H04W 4/00 | (2009.01) |
| H04W 4/14 | (2009.01) |
| H04W 4/18 | (2009.01) |
| H04M 7/00 | (2006.01) |

(52) U.S. Cl.
CPC .............. *H04W 4/14* (2013.01); *H04M 7/0048* (2013.01); *H04W 4/18* (2013.01)

(58) Field of Classification Search
None
See application file for complete search history.

(56) References Cited

U.S. PATENT DOCUMENTS

| 2003/0109271 A1* | 6/2003 | Lewis et al. ................... 455/517 |
| 2003/0185353 A1* | 10/2003 | Fulton et al. ............... 379/88.14 |
| 2008/0233981 A1* | 9/2008 | Ismail ........................... 455/466 |
| 2010/0099446 A1* | 4/2010 | Panigrahi et al. ............ 455/466 |
| 2012/0040654 A1* | 2/2012 | Martin et al. ................. 455/418 |

OTHER PUBLICATIONS

Wikipedia, "Short Message Peer-to-Peer", http://en.wikipedia.org/wiki/Short_Message_Peer-to-Peer, Oct. 19, 2013, 5 pages.
Wikipedia, "Telelocator Alphanumeric Protocol", http://en.wikipedia.org/wiki/Telelocator_Alphanumeric_Protocol, Apr. 9, 2013, 2 pages.

* cited by examiner

*Primary Examiner* — Suhail Khan

(57) ABSTRACT

A conversion device may receive a first message in a Telelocator Alphanumeric Protocol (TAP) format. The first message may include information that identifies a user device as an intended recipient of the first message. The first message may not be transmissible over a wireless connection. The conversion device may convert the first message into a second message in a first format capable of being transmitted over the wireless connection. The second message may include information that identifies the user device. The conversion device may provide the second message, using the wireless connection, to a messaging device. The wireless message may cause the messaging device to convert the second message into a third message in a second format that is capable of being delivered to the identified user device. The wireless message may further cause the messaging device to provide the third message to the user device.

20 Claims, 12 Drawing Sheets

100 —▶

WIRELESS DELIVERY OF TELELOCATOR ALPHANUMERIC PROTOCOL (TAP) MESSAGES

BACKGROUND

Telelocator Alphanumeric Protocol (TAP) is an industry-standard protocol for sending short messages via a land-line modem to a provider of pager and/or Short Message Service (SMS) services, for onward transmission to pagers and/or mobile phones.

DETAILED DESCRIPTION OF PREFERRED EMBODIMENTS

The following detailed description of example implementations refers to the accompanying drawings. The same reference numbers in different drawings may identify the same or similar elements.

Telelocator Alphanumeric Protocol (TAP) is an industry-standard protocol for sending short messages via a land-line modem to a provider of pager and/or Short Message Service (SMS) services, for onward transmission to pagers and/or mobile phones. Many emergency services use TAP to send messages to emergency personnel in the field. A TAP message is typically sent over a plain old telephone service (POTS) wire to a messaging provider, where the TAP message may then be converted into an SMS message and provided to a mobile device. However, many POTS wires have deteriorated and have not been maintained due to the proliferation of wireless communications. Wireless carriers face are finding it difficult and expensive to support TAP equipment and messaging as carrier TAP equipment ages and vendors have begun to discontinue TAP equipment support. Implementations described herein assist TAP messaging users by providing a mechanism for these users to transmit the contents of a TAP message over a wireless network, thereby reducing the support and maintenance costs of networking equipment.

Figure 1:
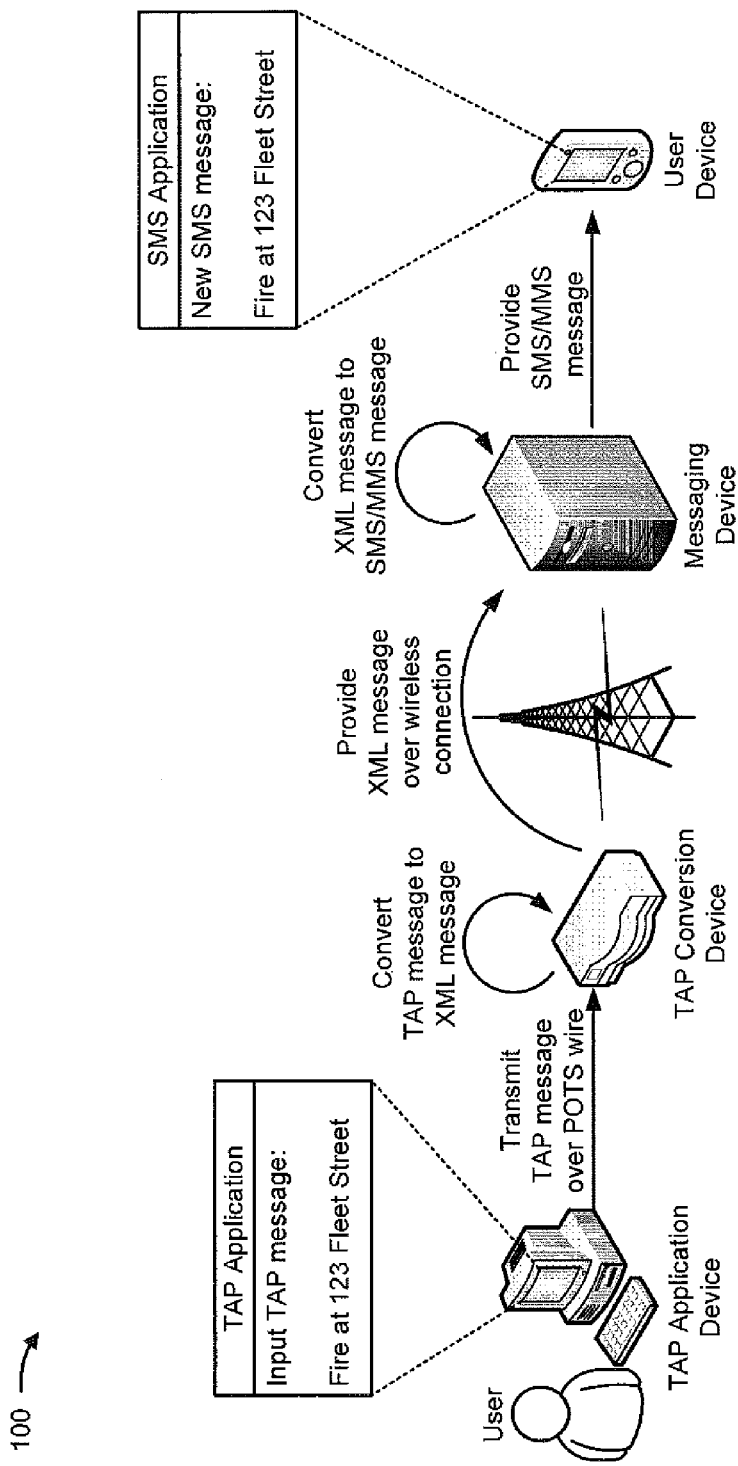
FIG. 1 is a diagram of an overview of an example implementation described herein.

FIG. 1 is a diagram of an overview of an example implementation 100 described herein. As shown in FIG. 1, assume that a user interacts with a TAP application device, such as a computer terminal that permits the transmission of TAP messages, to input a TAP message, shown as "Fire at 123 Fleet Street." As further shown, the TAP application device transmits the TAP message, over a POTS wire, to a TAP conversion device. The TAP conversion device converts the TAP message into a format that may be transmitted over a wireless connection. For example, assume that the TAP conversion device converts the TAP message into an Extensible Markup Language (XML) message.

As further shown in FIG. 1, the TAP conversion device transmits the XML message, over a wireless connection, to a messaging device, such as a messaging server. The messaging device converts the XML message to a format deliverable to a user device (e.g., a mobile device), such by converted the XML message to an SMS message or a multimedia messaging service (MMS) message. The messaging device then provides the SMS/MMS message to the user device (e.g., via a network and/or a network device), which may provide the message for display. In this way, the TAP conversion device allows the contents of a TAP message to be delivered over a wireless connection, even though the TAP message itself may not be deliverable over the wireless connection.

Figure 2:
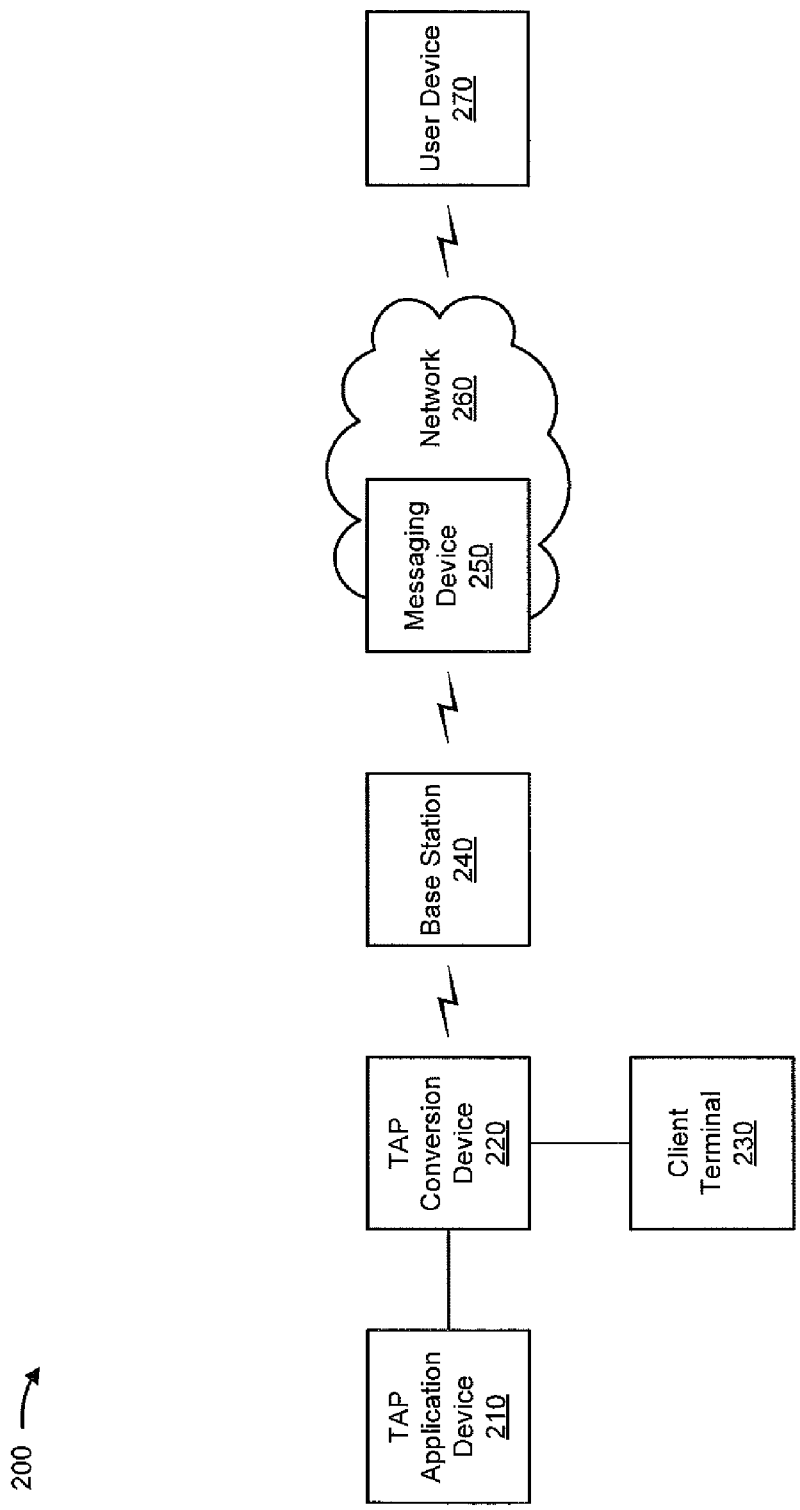
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a TAP application device 210, a TAP conversion device 220, a client terminal 230, a base station 240, a messaging device 250, a network 260, and a user device 270. Devices of environment 200 may interconnect via wired connections, wireless connections, or a combination of wired and wireless connections, unless described differently below.

TAP application device 210 may include one or more devices capable of generating, processing, storing, and/or providing TAP messages. For example, TAP application device 210 may include a computing and/or communication device, such as a computer terminal, a desktop computer, a laptop computer, a dedicated TAP terminal, or the like. TAP application device 210 may transmit TAP messages over a wired POTS line. In some implementations, TAP application device 210 may not be capable of receiving responses to TAP messages. Alternatively, TAP application device 210 may be integrated with another device, such as client terminal 230, that is capable of receiving responses to TAP messages.

TAP conversion device 220 may include one or more devices capable of receiving, storing, and/or processing TAP messages, and/or one or more devices capable of converting TAP messages into a format capable of being transmitted over a wireless connection (e.g., via base station 240), such as an XML format, and providing the converted messages to other devices over the wireless connection. For example, TAP conversion device 220 may include a traffic conversion and/or transfer device, such as a gateway, a router, a switch, a hub, or a similar device. In some implementations, TAP conversion device 220 may receive a TAP message from TAP application device 210, may convert the TAP message to an XML message, and may provide the XML message to base station 240 and/or messaging device 250 for forwarding to user device 270. Additionally, or alternatively, TAP conversion device 220 may receive a response message from user device 270 (e.g., in an XML format, an SMS format, an MMS format, etc.), and may provide the response message to client terminal 230 for display.

As an example, TAP conversion device 220 may include a POTS interface for interfacing with and/or receiving TAP messages from TAP application device 210. Additionally, or alternatively, TAP conversion device 220 may include a TAP proxy for converting TAP messages into a format capable of being transmitted over a wireless connection (e.g., an XML format, a Simple Network Paging Protocol (SNPP) format, a Short Message Peer-to-Peer (SMPP) format, a Simple Mail Transfer Protocol (SMTP) format, etc.). Additionally, or alternatively, TAP conversion device 220 may include a cellular modem for connecting to a network over an air interface (e.g., via base station 240), and for transmitting and/or receiving information over the air interface. TAP conversion device 220 may be located at the same location as TAP application device 210. For example, TAP conversion device 220 and TAP application device 210 may be located at a customer premises (e.g., an emergency service provider site).

Client terminal 230 may include one or more devices capable of receiving, generating, storing, processing, and/or providing information associated with TAP messages and/or information associated with TAP conversion device 220. For example, client terminal 230 may include a computing device, such as a computer terminal, a desktop computer, a laptop computer, a tablet computer, a mobile device, or the like. In some implementations, client terminal 230 may communicate with base station 240 and/or messaging device 250 to authenticate and/or register TAP conversion device 220 with a network (e.g., network 260). Additionally, or alternatively, client terminal 230 may receive a response message to a TAP message (e.g., a response message transmitted by user device 270)) from TAP conversion device 220, and may provide the response message for display.

Base station 240 may include one or more devices capable of receiving, generating, processing, storing, and/or providing network traffic, such as media, audio, video, text, and/or other traffic, destined for and/or received from TAP conversion device 220 and/or user device 270. In some implementations, base station 240 may include an eNodeB associated with a long term evolution (LTE) network that receives traffic from and/or sends traffic to network 260 via a packet data network gateway and/or a serving gateway. Additionally, or alternatively, one or more base stations 240 may be associated with a radio access network other than an LTE network. Base station 240 may send traffic to and/or receive traffic from TAP conversion device 220 and/or user device 270 via an air interface.

Messaging device 250 may include one or more devices capable of receiving, generating, processing, storing, and/or providing messages over a network (e.g., network 260). For example, messaging device 250 may include a computing device and/or a traffic transfer device, such as a server (e.g., a messaging server), a gateway (e.g., a messaging gateway, an enterprise messaging access gateway, etc.), a router, or a similar device. In some implementations, messaging device 250 may receive (e.g., via base station 240) a message from TAP conversion device 220 (e.g., an XML message, an SNPP message, etc., converted from a TAP message by TAP conversion device 220), may convert the message into a format deliverable to user device 270 (e.g., an SMS message, an MMS message, etc.), and may provide the converted message to user device 270. Additionally, or alternatively, messaging device 250 may receive a response message from user device 270, may convert the response message (e.g., into an XML message, an SNPP message, etc.), and may provide the converted message to TAP conversion device 220 (e.g., via base station 240).

Network 260 may include one or more wired and/or wireless networks. For example, network 260 may include a cellular network (e.g., a long term evolution (LTE) network, a code division multiple access (CDMA) network, etc.), a public land mobile network (PLMN), a Wi-Fi network, a local area network (LAN), a wide area network (WAN), a metropolitan area network (MAN), an ad hoc network, an intranet, the Internet, a fiber optic-based network, and/or a combination of these or other types of networks.

User device 270 may include one or more devices capable of receiving, generating, processing, storing, and/or providing messages (e.g., SMS messages, MMS message, etc.). For example, user device 270 may include a mobile device, such as a mobile phone, a smart phone, a radiotelephone, a personal communications systems (PCS) terminal, a personal digital assistant (PDA), or a similar device. In some implementations, user device 270 may receive a message (e.g., an SMS message, an MMS message, etc.) from messaging device 250, and may provide the message for display. Additionally, or alternatively, user device 270 may transmit a message (e.g., an SMS message, an MMS message, etc.), intended for TAP conversion device 220, to messaging device 250.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
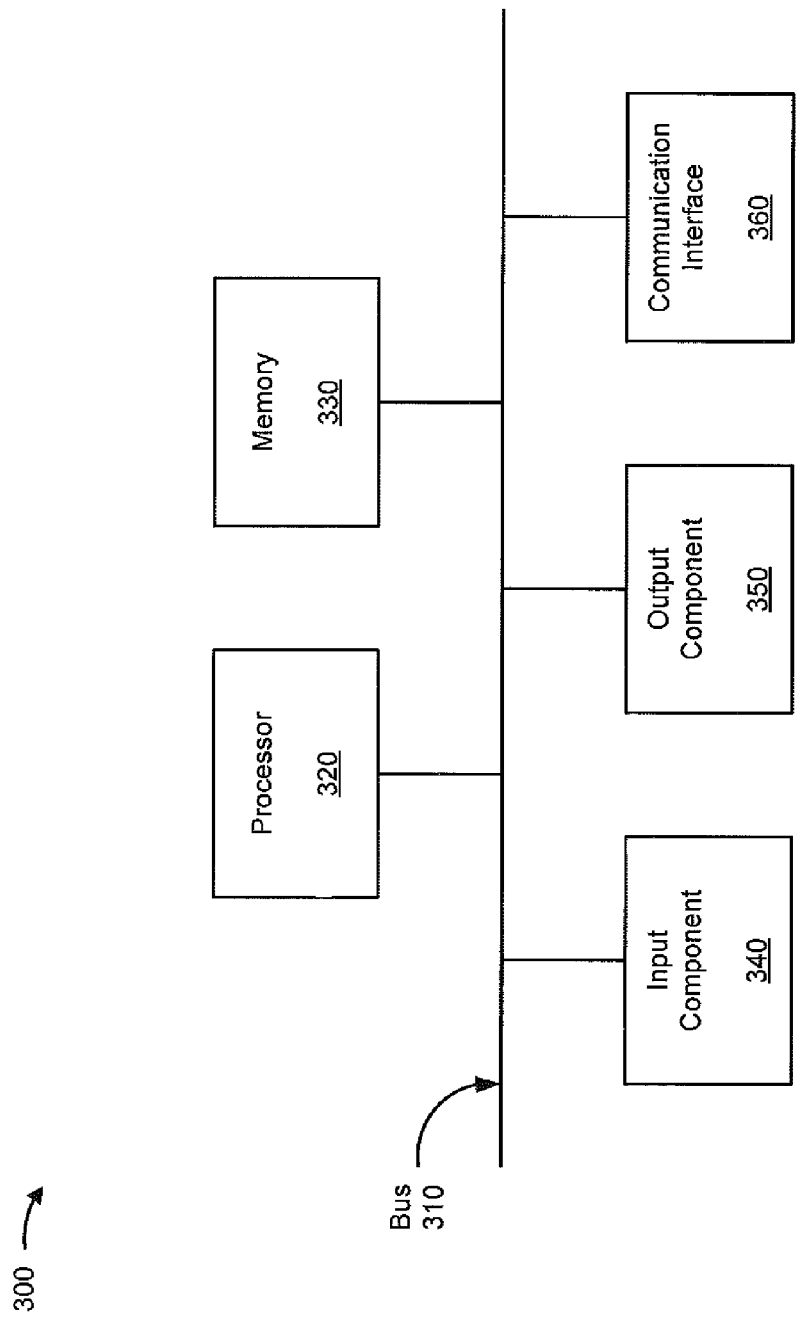
FIG. 3 is a diagram of example components of one or more devices of FIG. 2.

FIG. 3 is a diagram of example components of a device 300. Device 300 may correspond to TAP application device 210, TAP conversion device 220, client terminal 230, base station 240, messaging device 250, and/or user device 270. In some implementations, each of TAP application device 210, TAP conversion device 220, client terminal 230, base station 240, messaging device 250, and/or user device 270 may include one or more devices 300 and/or one or more components of device 300. As shown in FIG. 3, device 300 may include a bus 310, a processor 320, a memory 330, an input component 340, an output component 350, and a communication interface 360.

Bus 310 may include a component that permits communication among the components of device 300. Processor 320 may include a processor (e.g., a central processing unit, a graphics processing unit, an accelerated processing unit), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions included in a computer-readable medium, such as memory 330. A computer-readable medium is defined herein as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, one or more of the components of device 300 may perform one or more functions described as being performed by another one or more components of device 300.

Figure 4:
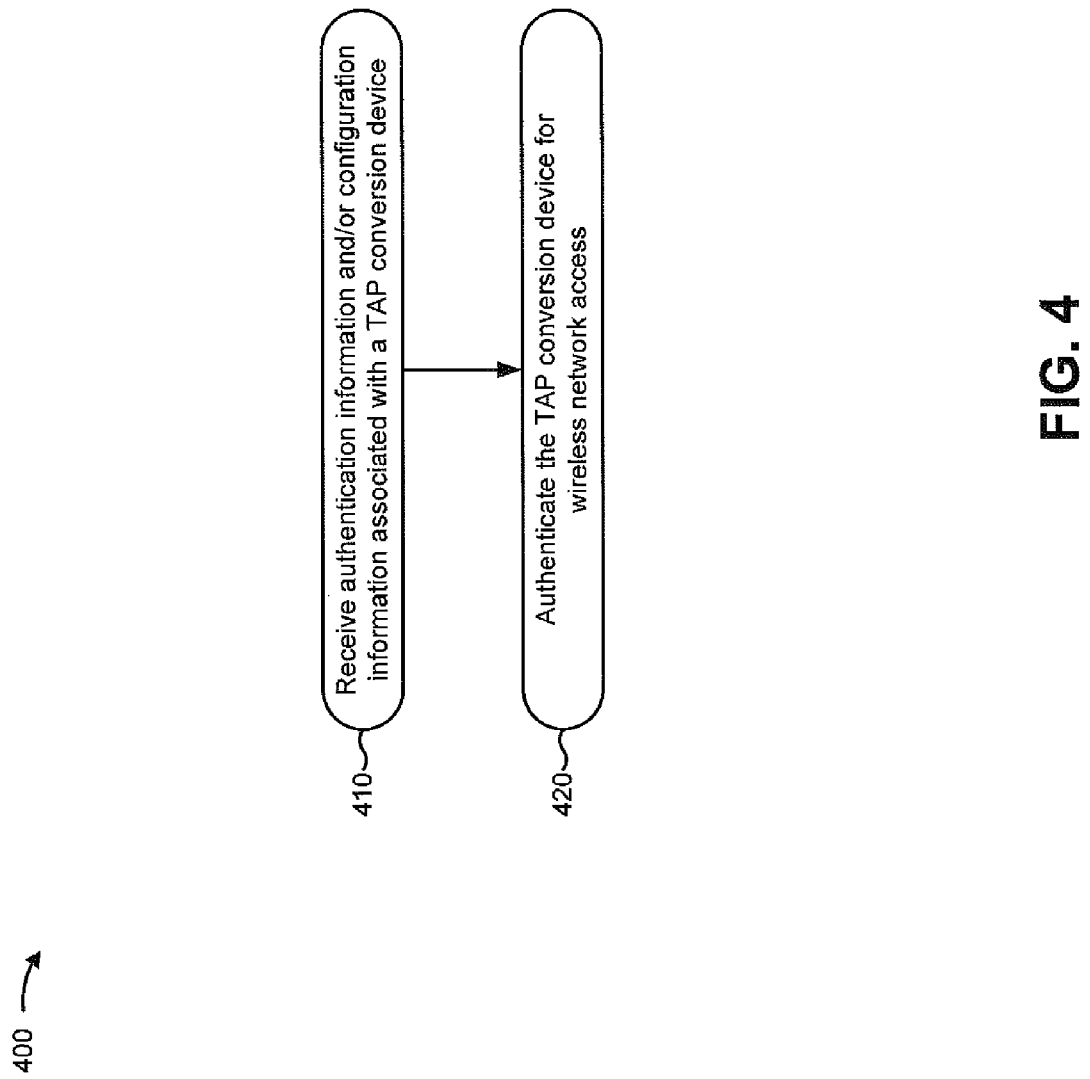
FIG. 4 is a flow chart of an example process for authenticating a TAP conversion device for wireless network access.

FIG. 4 is a flow chart of an example process 400 for authenticating a TAP conversion device for wireless network access. In some implementations, one or more process blocks of FIG. 4 may be performed by messaging device 250. Additionally, or alternatively, one or more process blocks of FIG. 4 may be performed by another device or a group of devices separate from or including messaging device 250, such as TAP application device 210, TAP conversion device 220, client terminal 230, base station 240, and/or user device 270.

As shown in FIG. 4, process 400 may include receiving authentication information and/or configuration information associated with a TAP conversion device (block 410). For example, messaging device 250 may receive authentication information, associated with TAP conversion device 220, from client terminal 230. Authentication information may include information that, when authenticated, permits TAP conversion device 220 to access a wireless network (e.g., to access messaging device 250 and/or network 260 via base station 240).

In some implementations, a user may use client terminal 230 to input authentication information, such as a username, a password, an identifier that identifies TAP conversion device 220 (e.g., a serial number, a name, an access code, an international mobile subscriber identity (IMSI), etc.), and/or other information that permits messaging device 250 to authenticate TAP conversion device 220. Client terminal 230 may transmit the input authentication information to messaging device 250. Additionally, or alternatively, TAP conversion device 220 may self-authenticate by sending authentication information to messaging device 250. In some implementations, messaging device 250 may authenticate TAP conversion device 220 by setting up a data path between TAP conversion device 220 and network 260.

Messaging device 250 may receive configuration information associated with TAP conversion device 220, in some implementations. Configuration information may include information that identifies one or more capabilities of TAP conversion device 220. For example, configuration information may identify whether TAP conversion device 220 is only capable of sending messages, or whether TAP conversion device 220 is capable of both sending and receiving messages. In some implementations, TAP conversion device 220 may be capable of receiving messages when TAP conversion device 220 is interfaced with another device capable of displaying messages, such as client terminal 230. This configuration information may control whether messaging device 250 attempts to provide response messages to TAP conversion device 220.

As another example, configuration information may identify a wireless message format that TAP conversion device 220 is capable of using for sending and/or receiving messages. The wireless message format may include, for example, an XML format, an SNPP format, an SMPP format, an SMTP format, an SMS format, an MMS format, a HyperText Transfer Protocol (HTTP) format, a HyperText Markup Language (HTML) format, etc. This configuration information may control a message format that messaging device 250 receives from and/or transmits to TAP conversion device 220. In some implementations, this configuration information may be used to negotiate a message format for messages communicated between messaging device 250 and TAP conversion device 220.

As another example, configuration information may identify a text message format that messaging device 250 is to use to transmit messages to user device 270. The text message format may include, for example, an SMS format, an MMS format, an email format, etc. This configuration information may control a message format that messaging device 250 uses to transmit messages to user device 270.

As further shown in FIG. 4, process 400 may include authenticating the TAP conversion device for wireless network access (block 420). For example, messaging server 250 may authenticate TAP conversion device 220 based on the authentication information. Authentication of TAP conversion device 220 may permit TAP conversion device 220 to access a wireless network (e.g., via base station 240), and/or may permit TAP conversion device 220 to transmit messages over the wireless network (e.g., using messaging server 250). Additionally, or alternatively, messaging server 250 may store configuration information, associated with TAP conversion device 220, and may use the configuration information to control a manner in which messaging server 250 interacts with TAP conversion device 220.

While messaging server 250 is described herein as authenticating TAP conversion device 220, in some implementations, another device may authenticate TAP conversion device 220, such as base station 240, a home subscriber server (HSS), an authentication, authorization, and accounting (AAA) server, or a combination of these and/or other devices. Once TAP conversion device 220 has been authenticated using the above process, TAP conversion device 220 may be able to send and/or receive messages without requiring the above authentication process to be performed again.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
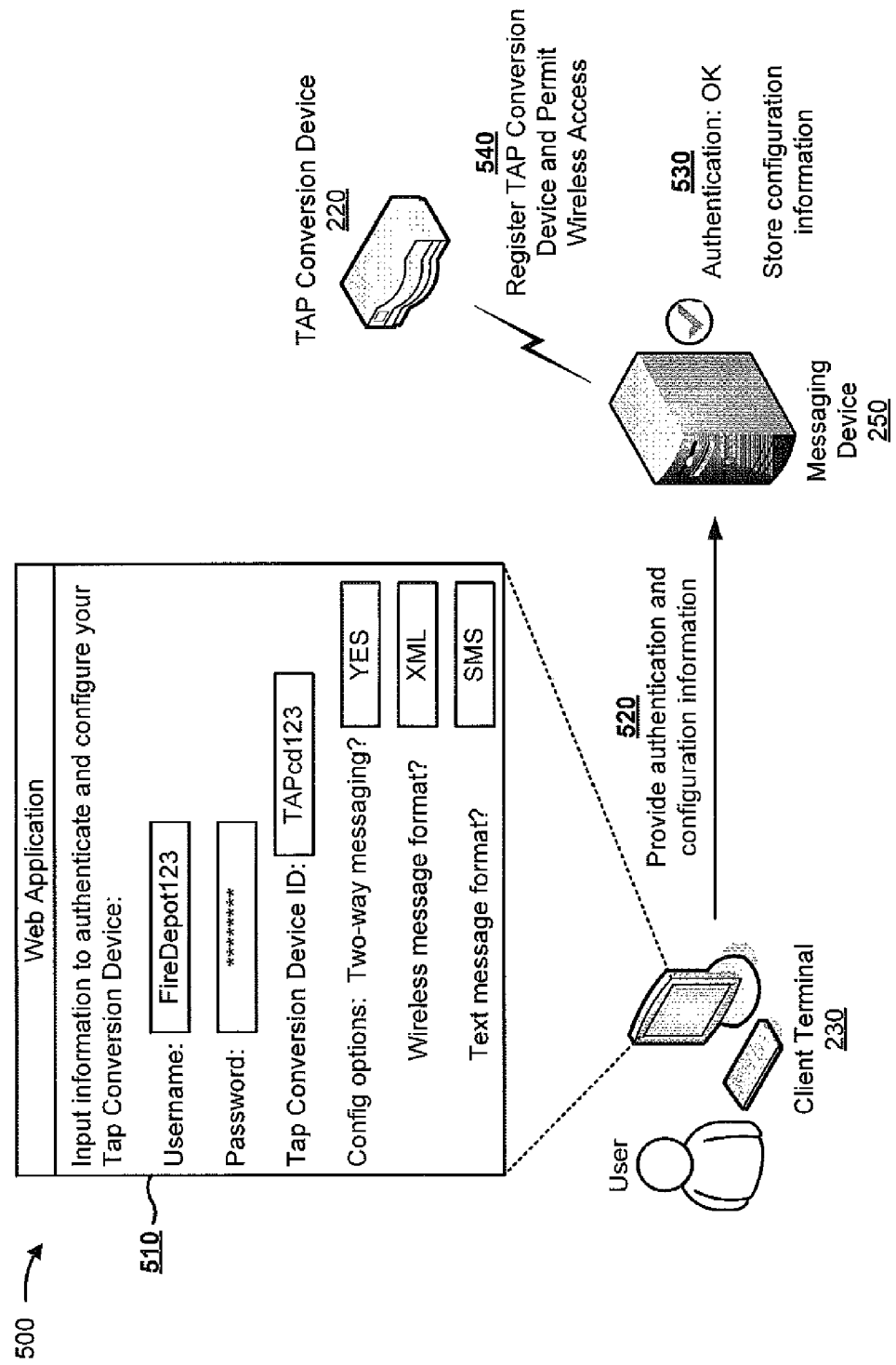
FIG. 5 is a diagram of an example implementation relating to the example process shown in FIG. 4.

FIG. 5 is a diagram of an example implementation 500 relating to example process 400 shown in FIG. 4. FIG. 5 shows an example process of authenticating TAP conversion device 220.

As shown in FIG. 5, and by reference number 510, assume that a user interacts with a web application, using a web browser executing on client terminal 230, to input authentication information and configuration information associated with TAP conversion device 220. As shown, assume that the user inputs a username and password associated with the user (e.g., used to access services associated with a service provider that provides messaging services associated with messaging device 250), and further inputs a TAP Conversion Device ID that identifies TAP conversion device 220 at the user's premises. Further, assume that the user inputs configuration information that indicates that TAP conversion device 220 is capable of sending and receiving messages (e.g., via two-way messaging), and that TAP conversion device 220 is capable of sending and receiving messages in an XML format. Further, assume that the user inputs configuration information that identifies a format for a text message to be delivered from messaging device 250 to user device 270 (e.g., an SMS format, as shown).

As shown by reference number 520, client terminal 230 provides the authentication information and the configuration information to messaging device 250. As shown by reference number 530, assume that messaging device 250 authenticates the user and TAP conversion device 220 (e.g., by accessing a data structure that stores authentication credentials) and stores the configuration information for later use when communicating with TAP conversion device 220. As shown by reference number 540, based on authenticating TAP conversion device 220, assume that messaging device 250 registers TAP conversion device 220 and permits TAP conversion device 220 to access a wireless network associated with messaging device 250.

As indicated above, FIG. 5 is provided merely as an example. Other examples are possible and may differ from what was described with regard to FIG. 5.

Figure 6:
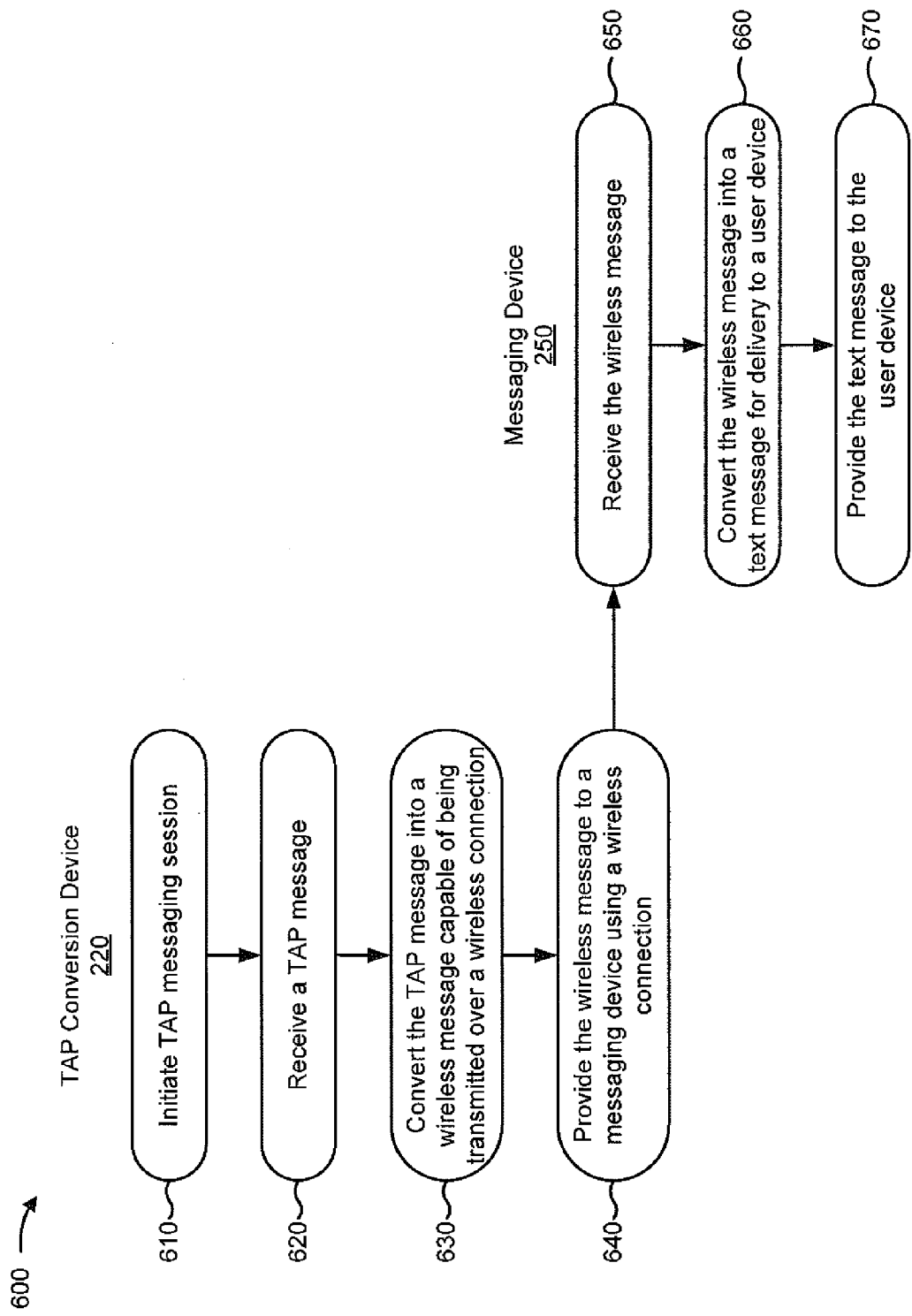
FIG. 6 is a flow chart of an example process for converting a TAP message into a format deliverable over a wireless network, and delivering the converted message over the wireless network.

FIG. 6 is a flow chart of an example process 600 for converting a TAP message into a format deliverable over a wireless network, and delivering the converted message over the wireless network. In some implementations, one or more process blocks of FIG. 6 may be performed by TAP conversion device 220 and/or messaging device 250. Additionally, or alternatively, one or more process blocks of FIG. 6 may be performed by another device or a group of devices separate from or including TAP conversion device 220 and/or messaging device 250, such as TAP application device 210, client terminal 230, base station 240, and/or user device 270.

As shown in FIG. 6, process 600 may include initiating a TAP messaging session (block 610). For example, TAP conversion device 220 may receive an indication to initiate a TAP messaging session (e.g., from TAP application device 210), and may initiate a TAP messaging session with messaging device 250. In some implementations, TAP conversion device 220 may receive the indication based on receiving a TAP message from TAP application device 210. Additionally, or alternatively, TAP conversion device 220 may receive the indication prior to receiving a TAP message from TAP application device 210.

TAP conversion device 220 may initiate a TAP messaging session with messaging device 250 by establishing a connection (e.g., a transmission control protocol (TCP) connection) with messaging device 250. TAP conversion device 220 may establish the connection using a wireless connection and/or an air interface (e.g., via base station 240).

As further shown in FIG. 6, process 600 may include receiving a TAP message (block 620), and converting the TAP message into a wireless message capable of being transmitted over a wireless connection (block 630). For example, TAP conversion device 220 may receive a TAP message from TAP application device 210. TAP conversion device 220 may receive the TAP message over a POTS interface that is physically connected to a wired POTS line that is physically connected to a POTS interface of TAP application device 210. The TAP message may be in a format that is incapable of being transmitted over a wireless connection (e.g., the TAP message may not be transmissible over a wireless connection).

TAP conversion device 220 may convert the TAP message into a wireless message. As used herein, a wireless message may refer to a message in a format that is capable of being delivered over a wireless connection (e.g., via an air interface to base station 240). For example, a wireless message may include a message in one or more of the following formats: an XML format, an SNPP format, an SMPP format, an SMTP format, an SMS format, an MMS format, an HTTP format, an HTML format, etc. TAP conversion device 220 may convert the TAP message into another format by decoding the TAP message to identify the content of the TAP message (e.g., the payload of the TAP message, the body of the TAP message, etc.), and then encoding the content into the other format.

As further shown in FIG. 6, process 600 may include providing the wireless message to a messaging device using a wireless connection (block 640). For example, TAP conversion device 220 may provide the wireless message to messaging device 250 using a wireless connection. For example, TAP conversion device 220 may provide the wireless message to base station 240 via an air interface, and base station 240 may provide the wireless message to messaging device 250 (e.g., via a wired or wireless connection). In some implementations, messaging device 250 may authenticate TAP conversion device 220, as described elsewhere herein. For example, messaging device 250 may authenticate TAP conversion device 220 when an initial message is received, and may establish a messaging session with TAP conversion device 220.

As further shown in FIG. 6, process 600 may include receiving the wireless message (block 650), converting the wireless message into a text message for delivery to a user device (block 660), and providing the text message to the user device (block 670). For example, messaging device 250 may receive a wireless message from TAP conversion device 220. In some implementations, messaging device 250 may receive the wireless message from TAP conversion device 220 via base station 240 and/or another network device (e.g., a packet data network gateway, a serving gateway, a router, etc.). The wireless message may be in a format that is not suitable for delivery to a user device (e.g., may not be in an SMS format, an MMS format, etc.).

Messaging device 250 may convert the wireless message into a text message. As used herein, a text message may refer to a message in a format that is suitable for delivery, over a wireless connection, to user device 270 (e.g., a mobile device), for display in a text messaging application. For example, a text message may include a message in an SMS format, an MMS format, etc. Messaging device 250 may convert the wireless message into another format by decoding the wireless message to identify the content of the wireless message (e.g., the payload of the wireless message, the body of the wireless message, etc.), and then encoding the content into the other format. The text message may include information identifying a user device 270 to which the text message is to be sent.

Messaging device 250 may provide the text message to user device 270 (e.g., via one or more base stations and/or other network devices). For example, user device 270 may be identified in the wireless message received from TAP conversion device 220 (and/or the TAP message originally provided to TAP conversion device 220), and messaging device 250 may provide the text message to the identified user device 270. In this way, the contents of a TAP message may be provided over a wireless network to user device 270 by converting the TAP message into one or more other formats capable of being transmitted over the wireless network.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
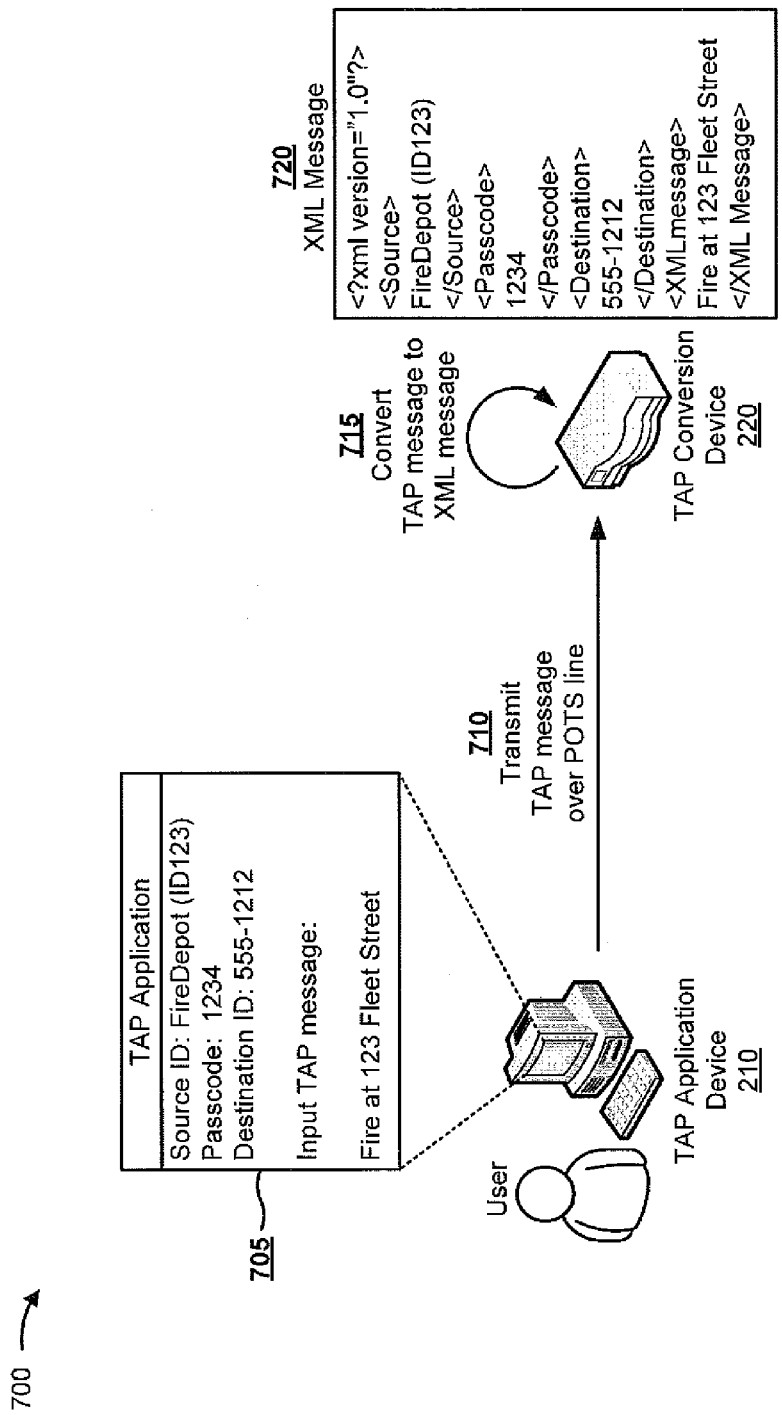
FIGS. 7A-7C are diagrams of an example implementation relating to the example process shown in FIG. 6.
Figure 7B:
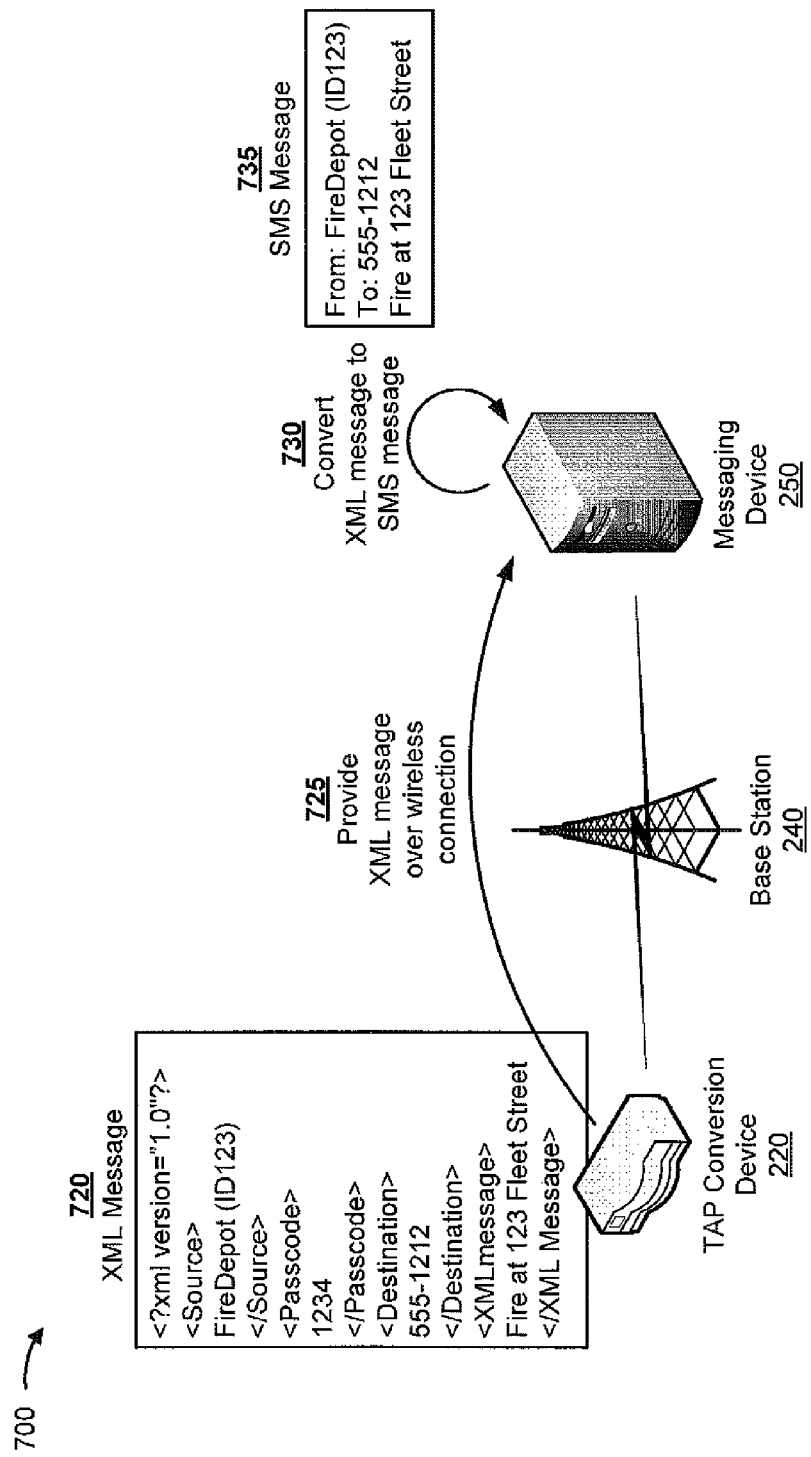
Figure 7C:
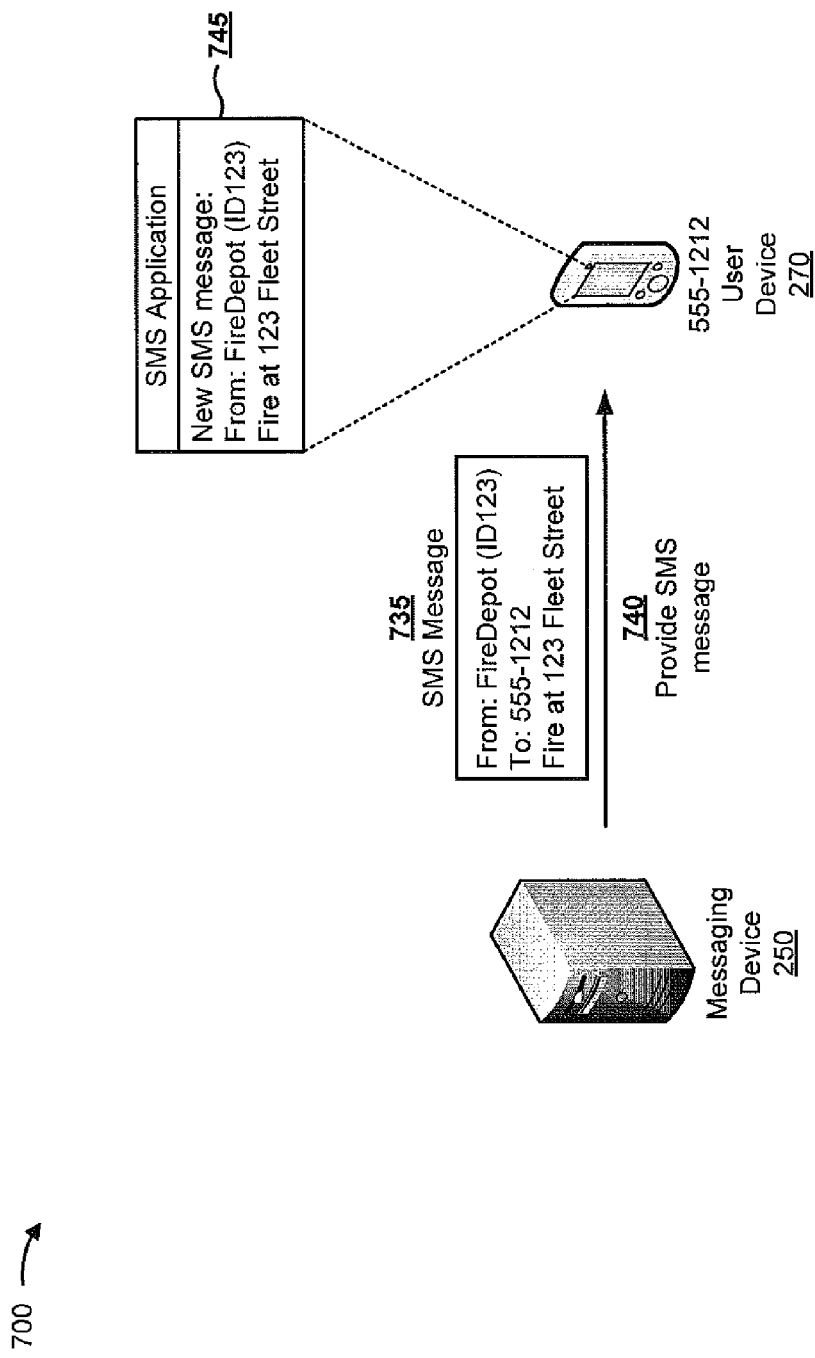

FIGS. 7A-7C are diagrams of an example implementation 700 relating to example process 600 shown in FIG. 6. FIGS. 7A-7C show an example of converting a TAP message into an XML message capable of being transmitted over a wireless network, and transmitting the XML message over the wireless network.

As shown in FIG. 7A, and by reference number 705, assume that a user, such as an emergency services operator, interacts with TAP application device 210 to input a TAP message into a TAP application executing on TAP application device 210. For example, assume that the user inputs the message "Fire at 123 Fleet Street," as shown. Further, assume that the user inputs a source of the message, shown as Fire-Depot with an IMSI number of 123, a destination for the message, shown as a phone number of 555-1212, and a passcode to authenticate and establish a messaging session, shown as 1234.

As shown by reference number 710, TAP application device 210 transmits the TAP message, the source identifier, the destination identifier, and the passcode over a wired POTS line to TAP conversion device 220. As shown by reference number 715, TAP conversion device 220 converts the TAP message to an XML message. Assume that TAP conversion device 220 converts the TAP message to an XML message based on a capability of TAP conversion device 220 (e.g., a configuration parameter). In some implementations, TAP conversion device 220 may convert the TAP message into another format. As further shown in FIG. 7A, assume that conversion of the TAP message to the XML message generates an XML message 720.

As shown in FIG. 7B, and by reference number 725, TAP conversion device 220 transmits XML message 720 to messaging device 250 over a wireless connection. For example, assume that TAP conversion device 220 transmits XML message 720 via a wireless connection (e.g., over an air interface) to base station 240. Base station 240 then provides XML message 720 to messaging device 250 via one or more network devices utilizing one or more wired and/or wireless connections. Messaging device 250 may authenticate TAP conversion device 220 to establish a messaging session (e.g., using the source and the passcode). As shown by reference number 730, messaging device 250 converts XML message 720 to an SMS message. Assume that messaging device 250 converts the XML message to an SMS message based on stored configuration information. In some implementations, messaging device 250 may convert the XML message into another format, such as an MMS message. As further shown in FIG. 7B, assume that conversion of the XML message to the SMS message generates an SMS message 735.

As shown in FIG. 7C, and by reference number 740, messaging device 250 provides SMS message 735 to user device 270, identified by the phone number 555-1212. As shown by reference number 745, user device 270 receives SMS message 735 and provides SMS message 735 for display via an SMS application. In this way, a user associated with user device 270, such as an emergency services field agent, may receive contents of a TAP message sent by another user, such as emergency services operator, interacting with TAP application device 210.

As indicated above, FIGS. 7A-7C are provided merely as an example. Other examples are possible and may differ from what was described with regard to FIGS. 7A-7C.

Figure 8:
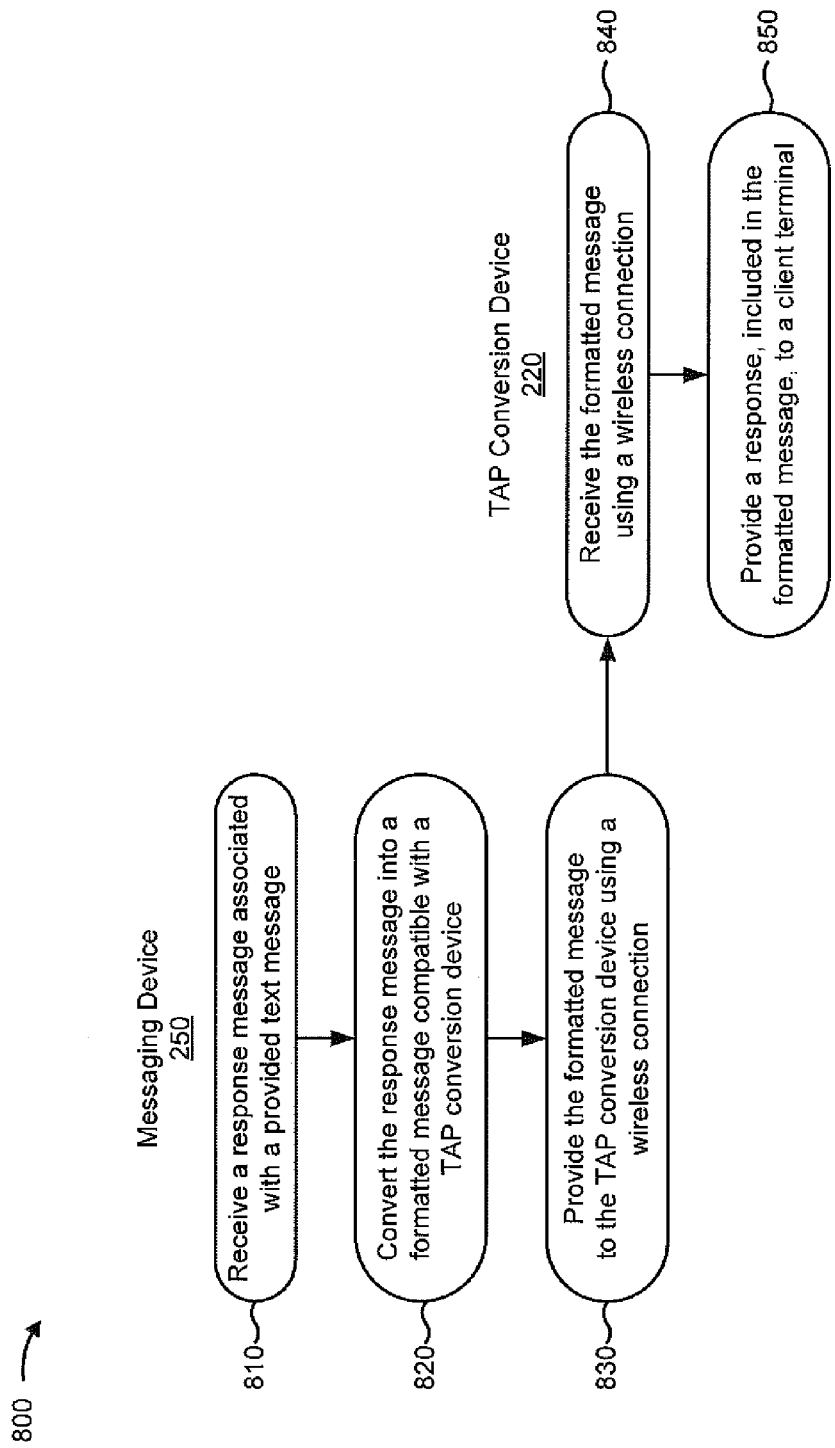
FIG. 8 is a flow chart of an example process for receiving a response to a converted TAP message delivered over a wireless network.

FIG. 8 is a flow chart of an example process 800 for receiving a response to a converted TAP message delivered over a wireless network. In some implementations, one or more process blocks of FIG. 8 may be performed by TAP conversion device 220 and/or messaging device 250. Additionally, or alternatively, one or more process blocks of FIG. 8 may be performed by another device or a group of devices separate from or including TAP conversion device 220 and/or messaging device 250, such as TAP application device 210, client terminal 230, base station 240, and/or user device 270.

As shown in FIG. 8, process 800 may include receiving a response message associated with a provided text message (block 810), and converting the response message into a formatted message compatible with a TAP conversion device (block 820). For example, messaging device 250 may receive a response message from user device 270. The response message may include a text message, such as an SMS message, an MMS message, an email message, etc. The response message may indicate that user device 270 received a text message sent by messaging device 250, and/or may include a new message for delivery to TAP conversion device 220.

Messaging device 250 may convert the response message into a formatted message that is compatible with TAP conversion device 220. The formatted message may be in a format that is capable of being delivered over a wireless connection (e.g., via an air interface from base station 240 to TAP conversion device 220). For example, the formatted message may include a message in one or more of the following formats: an XML format, an SNPP format, an SMPP format, an SMTP format, an SMS format, an MMS format, an HTTP format, an HTML format, etc. Messaging device 250 may convert the response message into another format by decoding the response message to identify the content of the response message (e.g., the payload of the response message, the body of the response message, etc.), and then encoding the content into the other format.

Messaging device 250 may convert the response message into a formatted message based on configuration information, in some implementations. For example, messaging device 250 may receive configuration information, associated with a particular TAP conversion device 220, that identifies a format for the formatted message. Messaging device 250 may convert the response message into the identified format.

As further shown in FIG. 8, process 800 may include providing the formatted message to the TAP conversion device using a wireless connection (block 830). For example, messaging device 250 may provide the formatted message to TAP conversion device 220 using a wireless connection. In some implementations, messaging device 250 may provide the formatted message to base station 240 (e.g., via one or more network devices, utilizing one or more wired and/or wireless connections), and base station 240 may provide the formatted message to TAP conversion device 220 via an air interface. In some implementations, messaging device 250 may determine whether TAP conversion device 220 is capable of receiving response messages and/or is configured to receive response messages (e.g., based on configuration information).

In some implementations, messaging device 250 may prevent a response message from being converted into a formatted message and/or may prevent a formatted message from being provided to TAP conversion device 220 based on the configuration information (e.g., when the configuration information indicates that TAP conversion device 220 is not to receive messages). In some implementations, messaging device 250 may convert a response message into a formatted message and/or may provide a formatted message to TAP conversion device 220 based on the configuration information (e.g., when the configuration information indicates that TAP conversion device 220 is to receive messages).

In some implementations, a particular TAP conversion device 220 may be identified in the response message received from user device 270, and messaging device 250 may provide the formatted message to the identified TAP conversion device 220. Additionally, or alternatively, messaging device 250 may store information that identifies a particular TAP conversion device 220 and a particular user device 270 when providing a text message to the particular user device 270. When a response message is received from the particular user device 270, messaging device 250 may query the stored information (e.g., using an identifier of the particular user device 270) to identify the particular TAP conversion device 220. Messaging device 250 may provide the formatted message to the identified TAP conversion device 220.

As further shown in FIG. 8, process 800 may include receiving the formatted message using a wireless connection (block 840), and providing a response, included in the formatted message, to a client terminal (block 850). For example, TAP conversion device 220 may receive a formatted message from messaging device 250 (e.g., via a wireless connection with base station 240). TAP conversion device 220 may identify a response, from user device 270, included in the formatted message. For example, TAP conversion device 220 may decode the formatted message to identify the response.

In some implementations, TAP conversion device 220 may provide the response to client terminal 230. For example, TAP application device 210 may not be capable of receiving the response. In this case, TAP conversion device 220 may provide the response to another device, such as client terminal 230. In some implementations, however, TAP application device 210 may be integrated into another device that is capable of receiving the response. In this case, TAP conversion device 220 may provide the response to TAP application device 210 (or the device into which TAP application device 210 is integrated). Client terminal 230 and/or TAP application device 210 may provide the response for display (e.g., to an emergency services operator). In some implementations, client terminal 230 and TAP application device 210 may be integrated into a single device.

In this way, TAP conversion device 220 may permit an emergency service operator to receive an indication that the contents of a TAP message have been received by an emergency services field agent associated with user device 270. Furthermore, TAP conversion device 220 may permit the emergency service operator to receive response messages from the emergency services field agent.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9A:
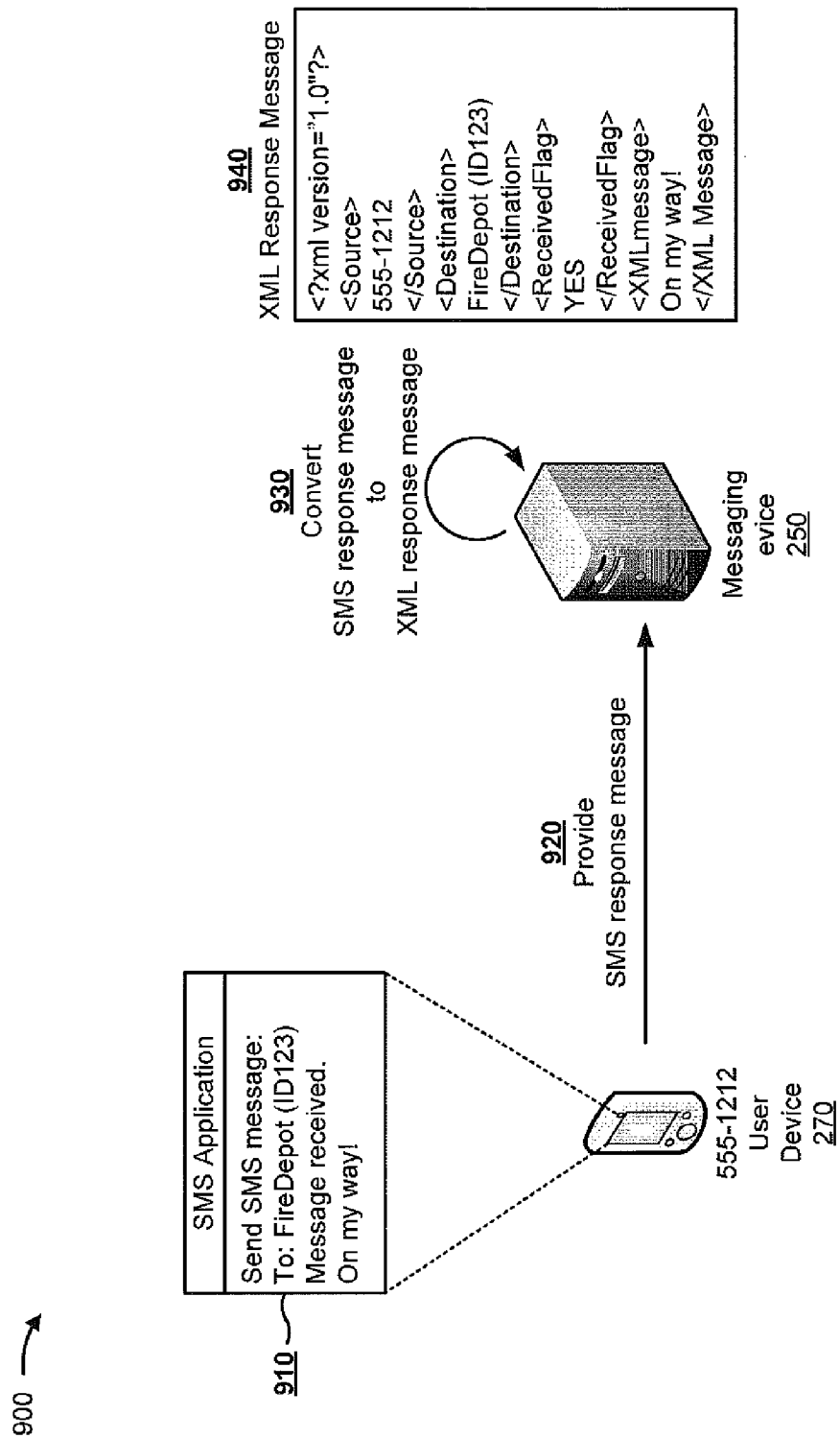
FIGS. 9A and 9B are diagrams of an example implementation relating to the example process shown in FIG. 8.
Figure 9B:
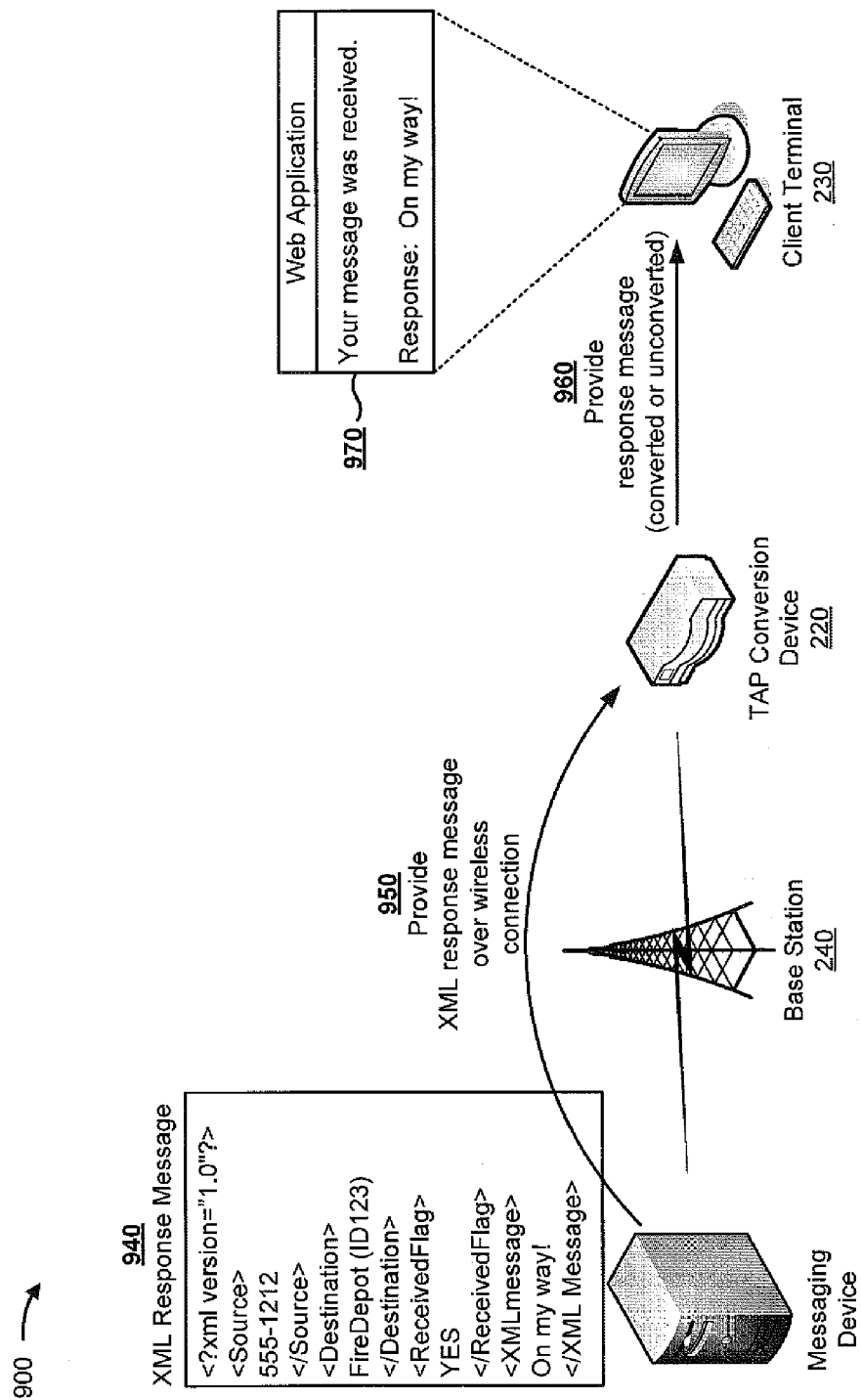

FIGS. 9A and 9B are diagrams of an example implementation 900 relating to example process 800 shown in FIG. 8. FIGS. 9A and 9B show an example of receiving a response to a converted TAP message delivered over a wireless network.

As shown in FIG. 9A, and by reference number 910, assume that a user inputs an SMS response message into user device 270, identified by the phone number 555-1212. Assume that the message identifies the recipient, shown as FireDepot with an IMSI of 123, includes an indication that the original message sent by FireDepot was received, and includes a textual response of "On my way!" As shown by reference number 920, user device 270 provides the SMS response message to messaging device 250. As shown by reference number 930, messaging device 250 converts the SMS response message to an XML response message. Assume that messaging device 250 converts the SMS response message to an XML response message based on configuration information. As further shown in FIG. 9A, assume that conversion of the SMS response message to the XML response message generates an XML response message 940.

As shown in FIG. 9B, and by reference number 950, messaging device 250 provides XML response message 940 to TAP conversion device 220 via a wireless connection (e.g., over an air interface from base station 240 to TAP conversion device 220). As shown by reference number 960, TAP conversion device 220 provides the response message to client terminal 230. In some implementations, such as when the format of the response message is readable and/or capable of being displayed by client terminal 230, TAP conversion device 220 may not convert the response message into another format, and may forward the response message to client terminal 230. In some implementations, such as when the format of the response message is not readable and/or not capable of being displayed by client terminal 230, TAP conversion device 220 may convert the response message to a format capable of being read by and/or displayed by client terminal 230, and may provide the converted message to client terminal 230.

As shown by reference number 970, assume that client terminal 230 provides the contents of the response message for display. For example, assume that client terminal 230 displays an indication that the original message from TAP application device 210 was received, and further displays the contents of the message sent by user device 270, shown as "On my way!"

As indicated above, FIGS. 9A and 9B are provided merely as an example. Other examples are possible and may differ from what was described with regard to FIGS. 9A and 9B.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A conversion device, comprising:
   one or more processors to:
      receive, over a wired connection, a Telelocator Alphanumeric Protocol (TAP) message,
         the TAP message identifying a user device as an intended recipient of the TAP message, and
         the TAP message not being transmissible over a wireless connection;
      convert the TAP message into a wireless message capable of being transmitted over the wireless connection,
         a wireless message format of the wireless message being different from a Short Messaging Service (SMS) format, and
         the wireless message identifying the user device; and
      provide the wireless message, using the wireless connection, to a messaging device,
         the wireless message causing the messaging device to convert the wireless message into a text message, that is capable of being delivered to the user device, and to provide the text message to the user device.

2. The conversion device of claim 1,
   where the one or more processors are further to:
      receive configuration information that identifies the wireless message format for the wireless message; and
   where the one or more processors, when converting the TAP message into the wireless message, are further to:
      convert the TAP message into the wireless message based on the wireless message format identified in the configuration information.

3. The conversion device of claim 1, where the wireless message format being an Extensible Markup Language (XML) format.

4. The conversion device of claim 1,
   where the one or more processors are further to:
      receive configuration information that identifies a text message format for the text message; and
   where the wireless message further causes the messaging device to convert the wireless message into the text message based on the text message format identified in the configuration information.

5. The conversion device of claim 4, where the text message format includes at least one of:
   the SMS format, or
   a Multimedia Messaging Service (MMS) format.

6. The conversion device of claim 1, where the one or more processors, when receiving the TAP message over the wired connection, are further to:
   receive the TAP message over a plain old telephone service (POTS) wire.

7. The conversion device of claim 1, where the one or more processors are further to:
   receive a response message from the user device and via the messaging device; and
   provide the response message to a client terminal for display.

8. A non-transitory computer-readable medium storing instructions, the instructions comprising:
   one or more instructions that, when executed by one or more processors, cause the one or more processors to:
      receive a first message in a Telelocator Alphanumeric Protocol (TAP) format,
         the first message including information that identifies a user device as an intended recipient of the first message, and
         the first message not being transmissible over a wireless connection;
      convert the first message into a second message in a first format capable of being transmitted over the wireless connection,
         the first format being different from a Short Messaging Service (SMS) format, and
         the second message including information that identifies the user device; and
      provide the second message, using the wireless connection, to a messaging device,
         the second message causing the messaging device to convert the second message into a third message in a second format that is capable of being delivered to the identified user device, and to provide the third message to the user device.

9. The non-transitory computer-readable medium of claim 8,
   where the one or more instructions, when executed by the one or more processors, further cause the one or more processors to:
      receive configuration information that identifies the first format; and
   where the one or more instructions, that cause the one or more processors to convert the first message into the second message, further cause the one or more processors to:
      convert the first message into the second message using the first format identified in the configuration information.

10. The non-transitory computer-readable medium of claim 8,
    where the one or more instructions, when executed by the one or more processors, further cause the one or more processors to:
       receive configuration information that identifies the second format; and
    where the second message further causes the messaging device to convert the second message into the third message using the second format identified in the configuration information.

11. The non-transitory computer-readable medium of claim 8,
    where the first format includes an Extensible Markup Language (XML) format, and
    where the second format includes at least one of:
       the SMS format,
       a Multimedia Messaging Service (MMS) format, or
       an email message format.

12. The non-transitory computer-readable medium of claim 8, where the one or more instructions, when executed by the one or more processors, further cause the one or more processors to:
   initiate a messaging session with the messaging device; and
   negotiate the first format or the second format based on initiating the messaging session,
      the negotiation identifying the first format or the second format based on information that identifies a capability of the messaging device and another device that provides the second message to the messaging device.

13. The non-transitory computer-readable medium of claim 12, where the one or more instructions, that cause the one or more processors to initiate the messaging session, further cause the one or more processors to:
   initiate the messaging session based on receiving the first message.

14. The non-transitory computer-readable medium of claim 8, where the first format is different from the second format.

15. A method, comprising:
   receiving, by a conversion device, a first message that is in a first format,
      the first format being a Telelocator Alphanumeric Protocol (TAP) format, and
      the first message in the first format not being transmissible over a wireless connection;
   converting, by the conversion device, the first message into a second message that is in a second format,
      the second format being different from a Short Messaging Service (SMS) format, and
      the second message being transmissible over the wireless connection; and
   providing, by the conversion device and via the wireless connection, the second message to a messaging device,
      providing the second message causing the messaging device to convert the second message into a third message that is in a third format, and
      providing the second message causing the messaging device to provide the third message to a user device.

16. The method of claim 15, further comprising:
   providing, to the messaging device, configuration information that indicates that the conversion device is capable of receiving response messages; and
   receiving, from the messaging device and based on providing the configuration information, a response message transmitted by the user device.

17. The method of claim 16, further comprising:
   providing the response message to a client terminal for display.

18. The method of claim 16, further comprising:
   providing, to the messaging device, information that identifies a response format for the response messages; and
   causing, based on providing the information that identifies the format for the response messages, the messaging device to convert the response message into the response format,
      where receiving the response message further comprises:
         receiving the response message in the response format.

19. The method of claim 15, further comprising:
   receiving configuration information that identifies the second format,
      where converting the first message into the second message comprises:
         converting the first message from the first format into the second format using the second format identified in the configuration information.

20. The method of claim 15, further comprising:
   receiving configuration information that identifies the third format,
      where causing the messaging device to convert the second message into the third message comprises:
         causing the messaging device to convert the second message into the third message using the third format identified in the configuration information.

\* \* \* \* \*